US006594787B1

(12) United States Patent
Chesson

(10) Patent No.: US 6,594,787 B1
(45) Date of Patent: Jul. 15, 2003

(54) INPUT/OUTPUT DEVICE MANAGED TIMER PROCESS

(75) Inventor: Gregory L. Chesson, Palo Alto, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/399,437

(22) Filed: Sep. 17, 1999

(51) Int. Cl.[7] .................................................. G06F 11/30
(52) U.S. Cl. ............................................ 714/56; 714/44
(58) Field of Search ............................... 714/55, 56, 43, 714/44; 710/15, 46

(56) References Cited

U.S. PATENT DOCUMENTS

| 5,388,254 A | * | 2/1995 | Betz et al. ..................... 714/16 |
| 5,651,113 A | * | 7/1997 | Lin et al. ...................... 710/58 |
| 5,768,620 A | * | 6/1998 | Johnson et al. ................ 710/15 |
| 5,946,498 A | * | 8/1999 | Chiang et al. ............... 709/207 |
| 5,996,001 A | * | 11/1999 | Quarles et al. .............. 709/101 |
| 6,012,090 A | * | 1/2000 | Chung et al. ................ 709/218 |
| 6,173,339 B1 | * | 1/2001 | Yorimitsu .................... 710/260 |

* cited by examiner

Primary Examiner—Scott Baderman
(74) Attorney, Agent, or Firm—Sterne, Kessler, Goldstein & Fox, P.L.L.C.

(57) ABSTRACT

A system and method thereof for monitoring elapsed time for a transaction. A computer system executes an application to initiate a transaction. An input/output device communicatively coupled to the computer system receives the transaction from the computer system. The input/output device is adapted to have a timer for measuring time until, for example, a response to the transaction is generated. The input/output device monitors the timer to identify when a time period allotted for the response to the transaction is exceeded (e.g., a timeout condition). The input/output device generates a signal to indicate the timeout condition.

55 Claims, 5 Drawing Sheets

INPUT/OUTPUT DEVICE MANAGED TIMER PROCESS

FIELD OF THE INVENTION

The present invention relates to an input/output (I/O) device managed timeout process.

BACKGROUND OF THE INVENTION

Computers are becoming ever more powerful, faster, and versatile. Correspondingly, the software being developed to harness the power of the newer computers are becoming more complex and sophisticated. With the advent of the Internet and vast improvements in the networking, telecommunications, and database fields, computer software is becoming even larger and more complex. For instance, an operating system can multi-task several different software applications, each of which can have multiple tasks, processes, and threads all running at the same time. Furthermore, devices such as modems, network interface cards, scanners, printers, graphics subsystems, audio cards, digital cameras, hard disks, CD ROM drives, etc., greatly add to the software complexity of monitoring, instructing, and otherwise communicating with these additional devices.

The potential downside to these enhanced capabilities and devices is that software glitches may periodically occur. Even a relatively minor software error can crash the entire system, resulting in lengthy, aggravating, and costly downtimes. In worst case scenarios, software glitches might cause critical data to be lost or corrupted.

In an effort to improve the reliability of software, developers have commonly relied upon the use of timers. Typically, a timer is used to monitor certain events to ensure that they function properly. A timeout condition is set to expire after a certain amount of time has elapsed. For example, suppose that a certain task is initiated and it is expected to be completed after a certain period of time. A timer can be set to elapse after that period of time. If the task is successfully completed within the allotted time, the timeout is canceled. Otherwise, if there happens to be a malfunction, the elapsed time expires and a timeout condition is generated. Thereupon, the system now knows that an error has occurred.

At this point, there are several options: an error condition can be generated and reported to a human operator who may then take appropriate corrective action; a separate piece of software may be notified of the error and initiated to correct the error condition; or the original piece of software may be re-executed with the hope that it will properly function the second time around. Hence, rather than trusting that a job, process, activity, communication, or some other operation will finish successfully, a timer can be used to bound the operation at issue. This facilitates a smoother running system and improves overall system reliability.

For larger computer systems, timers can be implemented in hardware. A separate processor can be dedicated to handling timers and timeout conditions. However, larger computer systems are more expensive to design and manufacture. Consequently, timers are most often implemented in software—specifically, as part of the kernel facility of the computer's operating system (O/S), such as UNIX, Windows, NT, Linux, etc.

Unfortunately, timers have a fair degree of associated overhead. First, the timer has to be initiated. Next, the timer has to be monitored while it is running. If the task successfully completes, the timer has to be canceled. Otherwise, the operating system has to detect and respond to any potential timeouts.

The incremental cost of implementing a single timer is slight compared to the benefit attained. However, a single O/S can have many, multiple tasks running at any given time. This is especially the case with client/server, Internet/Web, and network/communications applications. The large number of activities, each of which may be covered by one or more timers, can dramatically impact and eventually overwhelm the computer's processing capability. Thus, computer system designers are faced with a dilemma: either pare back the number of timers and suffer the risk of potentially unstable software, or improve the overall reliability of the system by implementing more timers at the expense of degraded performance.

Accordingly, what is needed is a system or method for implementing timers such that timer overhead to the O/S is minimized, so that the robustness of a computer system is enhanced by implementing timers while the impact associated with operating these timers is substantially minimized. The present invention provides a novel solution to the above needs.

These and other objects and advantages of the present invention will become obvious to those of ordinary skill in the art after having read the following detailed description of the preferred embodiments which are illustrated in the various drawing figures.

SUMMARY OF THE INVENTION

The present invention provides a novel solution for using timers in such a way that they can be implemented with minimal overhead to the O/S. With the present invention, the robustness of a computer system is enhanced by implementing timers while the impact associated with operating these timers is substantially minimized.

The present invention pertains to a system and method thereof managed by an input/output device for monitoring elapsed time for a transaction. In the present embodiment, a computer system executes an application to initiate a transaction. The input/output device is communicatively coupled to the computer system and receives the transaction from the computer system. The input/output device is adapted to have a timer for measuring time until, for example, a response to the transaction is generated. The input/output device cancels the timer provided a cancellation condition is satisfied and otherwise identifies a timeout condition.

In the present embodiment, the input/output device can have a plurality of timers that each monitor one of a plurality of multiple concurrent transactions.

In the present embodiment, the input/output device generates a signal to indicate the timeout condition. In one embodiment, the signal is sent from the input/output device to the computer system's operating system. In another embodiment, the transaction is sent from the application to the input/output system bypassing the computer system's operating system, and the signal from the input/output device is sent to the application also bypassing the operating system.

In one embodiment, the cancellation condition is a time period allotted for the response to the transaction. The input/output device cancels the timer provided the response to the transaction occurs within the time period allotted and identifies a timeout condition when the time period allotted is exceeded.

In one embodiment, the time period allotted for the response is specified in a control command associated with the transaction received by the input/output device from the computer system.

In one embodiment, an expected response to the transaction is specified. The input/output device uses the expected response to recognize the response to the transaction.

In one embodiment, the input/output device is a peripheral device (e.g., a graphics adapter, video adapter, etc.) that executes the transaction in response to the application. In another embodiment, the input/output device is a communication device (e.g., a network interface card, network adapter, etc.) that couples the computer system to an external device that executes the transaction in response to the application.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
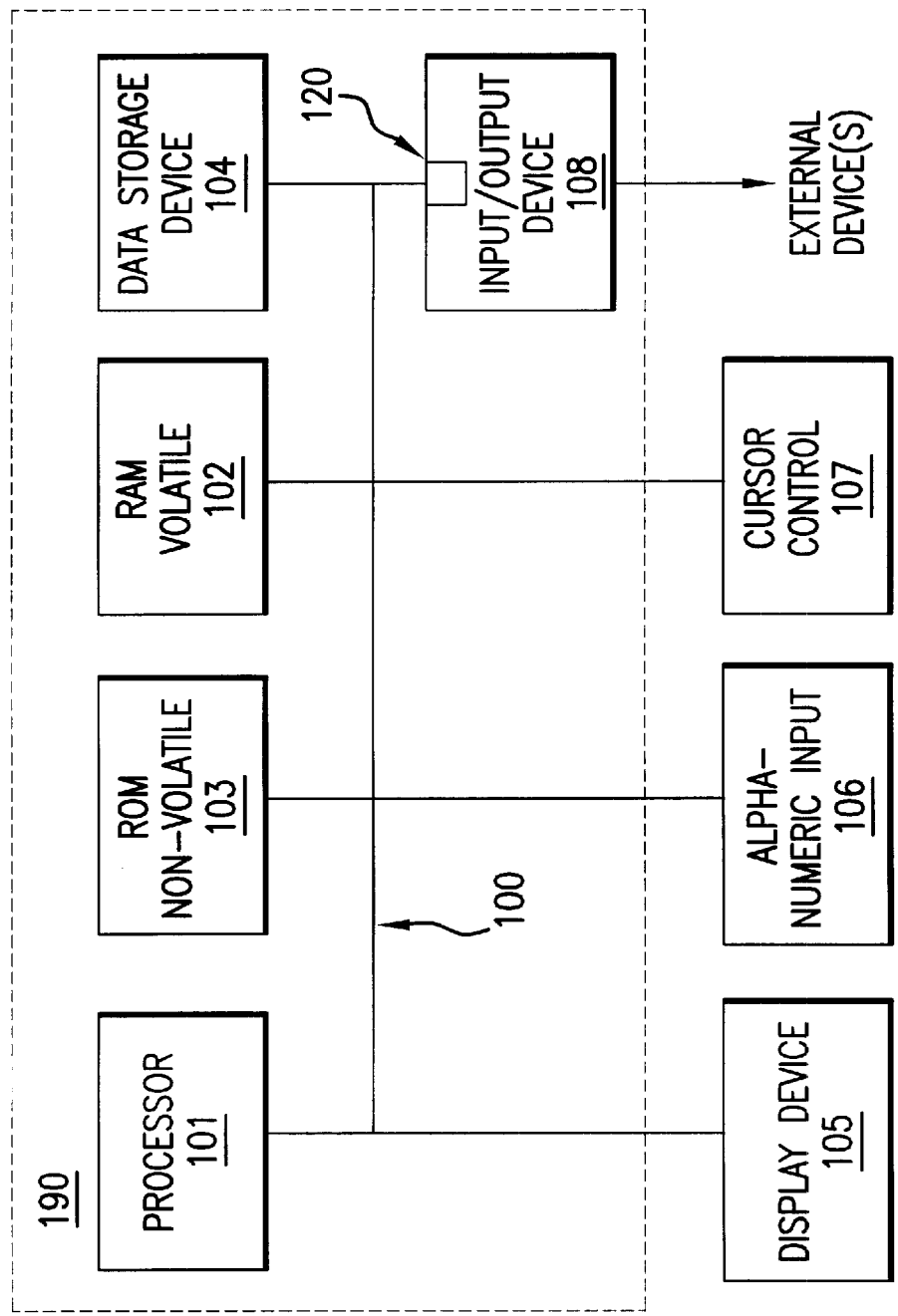
FIG. 1A is a block diagram of one embodiment of an input/output device and computer system in accordance with the present invention.

A timer process managed by an input/output (I/O) device is described. Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process (e.g., the processes of FIGS. 3 and 4), or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and each block making up a transaction. A transaction may also consist of an operation or a sequence of operations, or a sequence of smaller transactions.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "initiating," "sending," "activating," "monitoring," "generating," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Figure 1B:
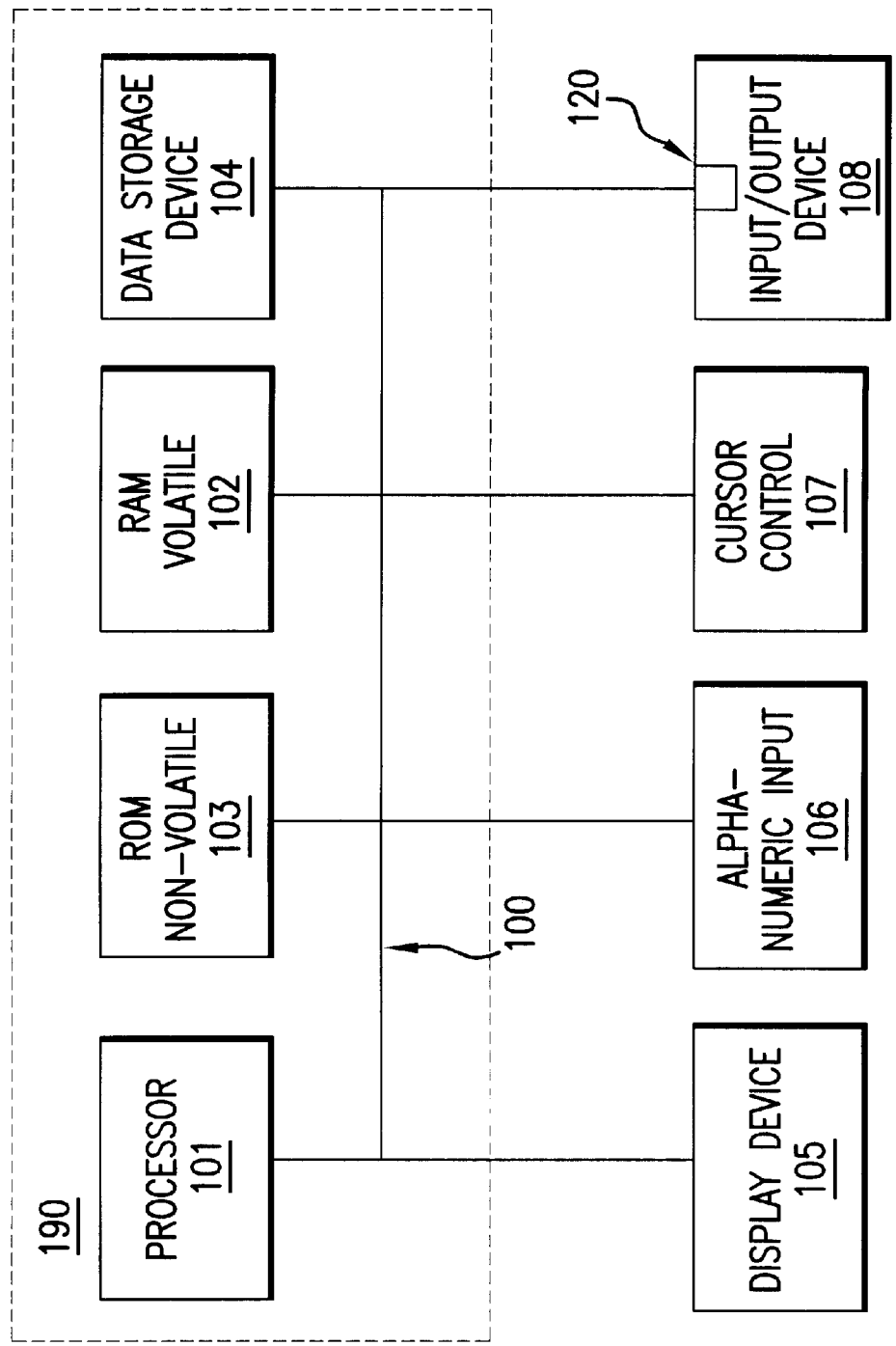
FIG. 1B is a block diagram of another embodiment of an input/output device and computer system in accordance with the present invention.

FIGS. 1A and 1B show different embodiments of exemplary computer systems upon which the present invention may be practiced. In general, computer system 190 comprises a bus 100 for communicating information, a central processor 101 coupled with bus 100 for processing information and instructions, a random access memory 102 coupled with bus 100 for storing information and instructions for central processor 101, a read-only memory 103 coupled with bus 100 for storing static information and instructions for central processor 101, a data storage device 104 such as a magnetic or optical disk and disk drive coupled with bus 100 for storing information and instructions, an optional display device 105 coupled to bus 100 for displaying information to the computer user, an optional alphanumeric input device 106 including alphanumeric and function keys coupled to bus 100 for communicating information and command selections to central processor 101, and an optional cursor control device 107 coupled to bus 100 for communicating user input information and command selections to central processor 101. Computer system 190 is also coupled to an input/output (I/O) device 108.

Optional display device 105 utilized with computer system 190 of the present invention may be a liquid crystal device, cathode ray tube, or other display device suitable for creating graphic images and alphanumeric characters recognizable to the user. Optional cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control device 107 also may be directed and/or activated via input from the keyboard using special keys and key sequence commands. Alternatively, the cursor may be directed and/or activated via input from a number of specially adapted cursor directing devices.

With reference to FIG. 1A, in one embodiment, I/O device 108 can be any of the various types of devices known in the art and used to communicatively couple computer system 190 to one or more external devices (not shown). In this embodiment, I/O device 108 is exemplified by a modem, a network interface card (NIC), a network adapter, or the like. The external device(s) can be another computer system (e.g., a server computer system), an audio device, a video device, or the like. Input/output device 108 may also incorporate a processor (not shown).

With reference to FIG. 1B, in another embodiment, I/O device 108 can be any of the various types of external (peripheral) devices known in the art and used with a computer system to implement an application initiated by the computer system. In this embodiment, I/O device 108 is a hardware device such as a graphics adapter, a video adapter, an audio device, a video device, or the like. It is appreciated that multiple and different types of I/O devices 108 can be coupled to computer system 190 and utilized in accordance with the present invention. Input/output device 108 may also incorporate a processor (not shown).

With reference to FIGS. 1A and 1B, in accordance with the present invention, input/output device. 108 incorporates timer 120. It is appreciated that input/output device 108 can include more than one timer. In accordance with the present invention, timer 120 may be implemented as a hardware component within input/output device 108. Timer 120 may also be implemented in software or firmware executed by input/output device 108, or as a combination of software, firmware and hardware. The present embodiment of the present invention integrates the timer and its functions within the operational environment of an input/output device. Thus, in the present embodiment, the processing overhead is shifted from processor 101 to input/output device 108, thereby reducing the processing overhead for computer system 190. As will be seen from the discussion below, this can also reduce the overall amount of processing overhead associated with implementing timers and timeout conditions.

In the present embodiment, timer 120 is used to monitor the elapsed time beginning when a control command associated with a transaction is received by input/output device 108 (for those transactions that are to be timed). Input/output device 108 uses timer 120 to implement a process (e.g., processes 300 and 400 of FIGS. 3 and 4, respectively) for monitoring elapsed time until a timer cancellation condition is satisfied; for example, timer 120 measures time until a response to a transaction is generated. If the cancellation condition is satisfied before an allotted time period is exceeded, timer 120 is canceled; otherwise, a timeout condition is identified.

Figure 2:
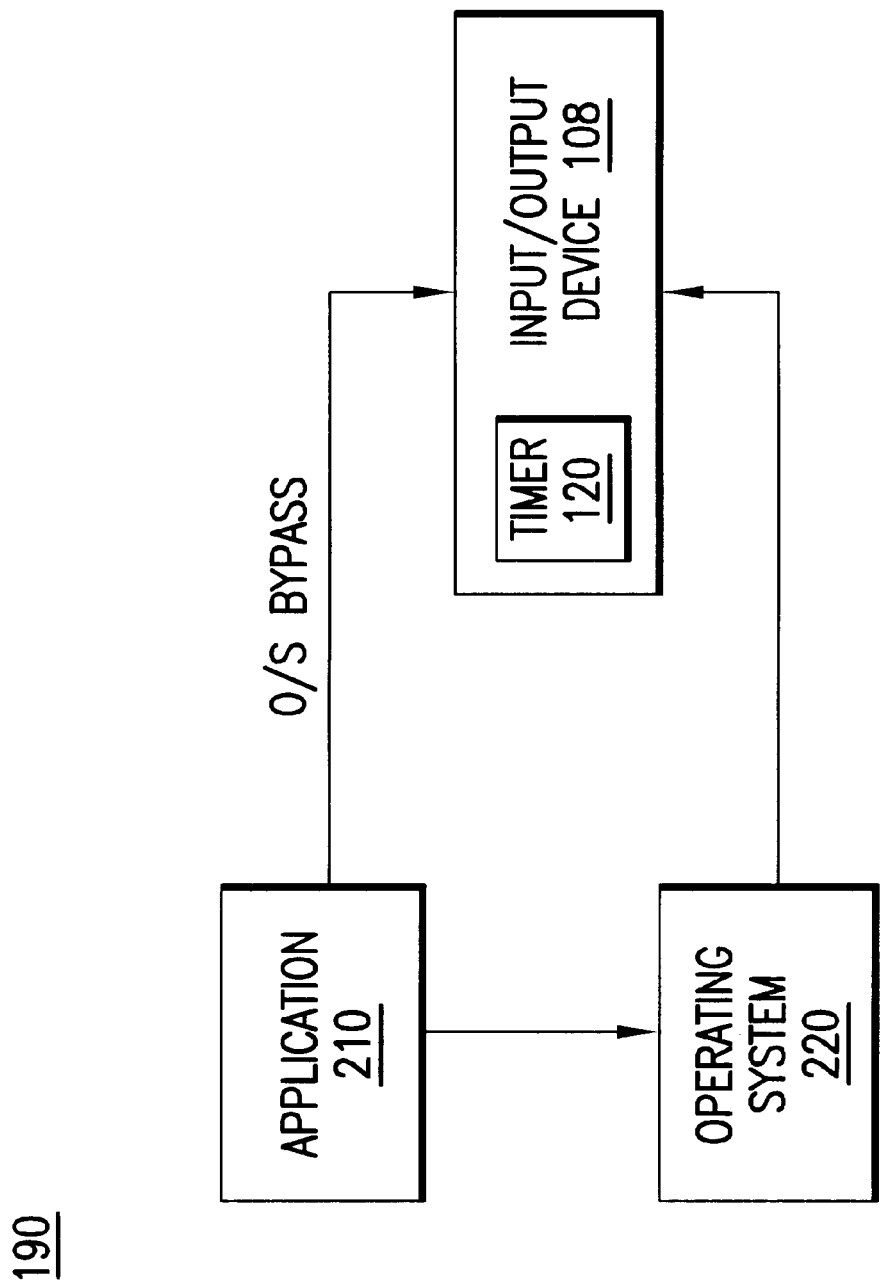
FIG. 2 illustrates data flow paths for transactions between an application and an input/output device in accordance with the present invention.

FIG. 2 illustrates data flow paths for transactions (e.g., including a control command) between application 210 (implemented on computer system 190) and input/output device 108. One path that can be taken by a transaction is from application 210 through operating system (O/S) 220 to input/output device 108. For example, application makes a system call to O/S 220 and communicates with a device driver, a protocol stack, a file system or the like.

A second path that can be taken by a transaction is to bypass O/S 220 and travel directly to input/output device 108 via a queue (e.g., "O/S bypass"). A queue is in place from application 210 to input/output device 108, and a queue is in place from input/output device 108 to application 210. The control surface of input/output device 108 is mapped into application 210 so that application 210 can control or program input/output device 108 directly, without a system call to O/S 220. In turn, input/output device 108 responds directly to application 210. O/S bypass is a technique known in the art in order to reduce latency, first used with graphics applications and extended to communications and networking applications. The present embodiment of the present invention is described primarily in the context of O/S bypass, although it is appreciated that the present invention is not limited to implementation with O/S bypass.

The control command associated with a transaction sent by application 210 to an I/O device (e.g., input/output device 108) triggers a timer in order to monitor and regulate the elapsed time allowed for the transaction; for example, the timer is used to limit the amount of time allotted for a response to a command. As described above, in accordance with the present invention, one or more timers (e.g., timer 120) are incorporated into input/output device 108; each timer monitors the elapsed time for a single transaction.

Input/output device 108 monitors each timer and generates a notification of a timeout condition when the time allocated for a response to a transaction is exceeded. In accordance with the present invention, a timeout condition is added to the list of events (e.g., read data, error, interrupt, etc.) that can be communicated by input/output device 108 to application 210 over the queue that is in place between input/output device 108 and application 210. In one embodiment, the timeout condition is a command code sent from input/output device 108 to application 210 via the queue. In another embodiment, a transaction (e.g., a response) sent via the queue from input/output device 108 to application 210 contains a bit flag that is set to indicate a timeout condition. In one aspect of this other embodiment, the bit flag can be used to cause an interrupt in the operating system corresponding to the timeout condition. Thus, in accordance with the present invention, the application of interest (e.g., application 210) is directly notified of the timeout condition, and it is not necessary for the operating system to seek out which application is affected by the timeout condition. Hence, processing overhead previously associated with identifying which application is affected by a timeout condition can be reduced.

In one embodiment, what would constitute a response to a transaction can be specified to input/output device 108 either in the transaction or beforehand (in which case the expected response can be stored in input/output device 108 using a lookup table or various other means). When input/output device 108 recognizes the expected response, timer 120 is canceled. For example, if an output message of "thanks" should generate a response of "you're welcome," then input/output device 108 would cancel timer 120 when the "you're welcome" message is recognized (and would initiate a timeout condition if the timer expires beforehand). In this manner, by using the response to cancel the timer, the processing overhead previously associated with canceling a timer can be reduced or eliminated.

Figure 3:
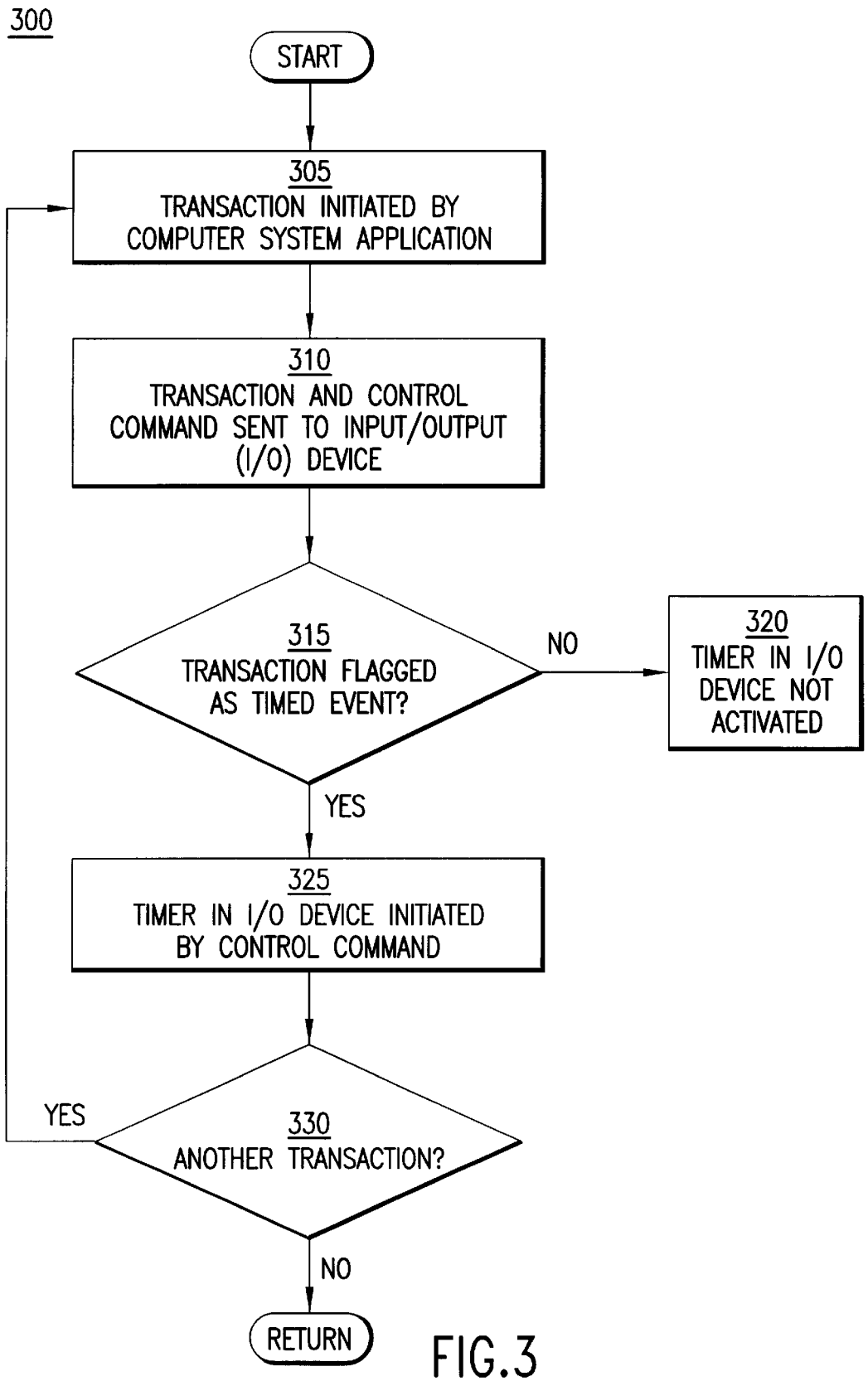
FIG. 3 is a flowchart of a process wherein a transaction is sent from an application to an input/output device in accordance with one embodiment of the present invention.

FIG. 3 is a flowchart of a process 300 wherein a transaction (e.g., including a control command) is sent from an application (e.g., application 210 of FIG. 2) to input/output device 108 (FIG. 2) in accordance with one embodiment of the present invention.

With reference to FIGS. 2 and 3, in step 305, a transaction is initiated by application 210. In one embodiment, the transaction is flagged if it is a timed event (that is, an event for which a timer should be activated). In accordance with the present invention, the length of time before the timer expires (that is, for example, the time period allotted for a response to be sent to the transaction) is also specified, either in the transaction or in the control command.

In step 310, the transaction is sent to input/output device 108. In one embodiment, the O/S bypass technique is implemented, although it is appreciated that the present invention is not limited to implementation with O/S bypass.

In step 315, in the present embodiment, input/output device 108 detects whether or not the transaction is a timed event. If not, a timer is not activated (step 320).

In step 325, for a timed event, timer 120 is activated by the control command. In the present embodiment, timer 120 begins a countdown using the specified time period from step 305.

In step 330, the process is repeated for subsequent transactions. In accordance with the present invention, a plurality of different timers can be used for multiple concurrent transactions involving either the same application or different applications.

Figure 4:
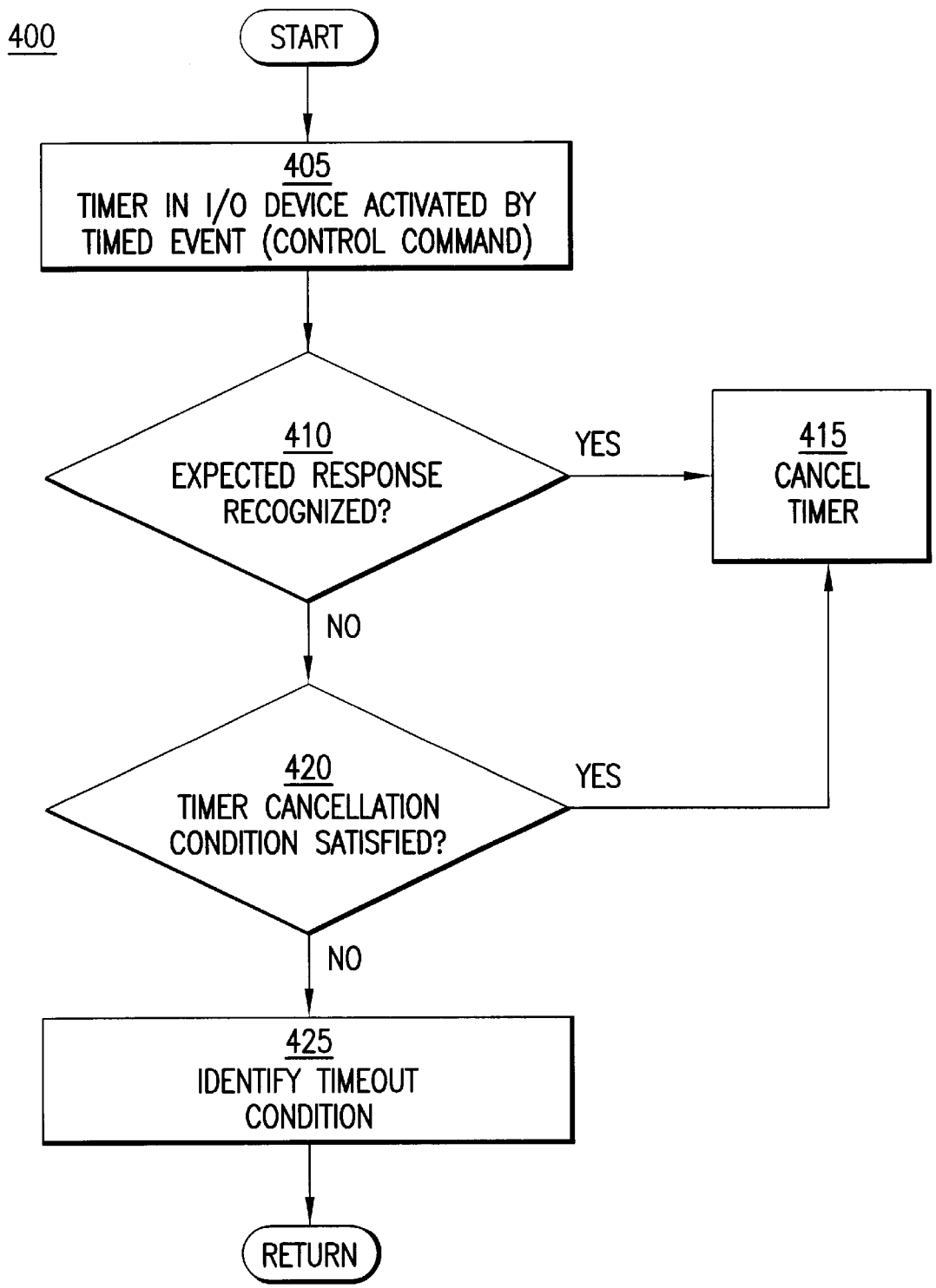
FIG. 4 is a flowchart of a process in which an input/output device receives a timed event from an application in accordance with one embodiment of the present invention.

FIG. 4 is a flowchart of a process 400 in which input/output device 108 (FIG. 2) receives a timed event from an application (e.g., application 210 of FIG. 2) in accordance with one embodiment of the present invention.

With reference to FIGS. 2 and 4, in step 405, a timed event (e.g., a transaction) is received by input/output device 108 and timer 120 is activated by the associated control command.

In step 410, in the present embodiment, an expected response to the transaction is specified to input/output device 108. It is appreciated that in another embodiment an expected response is not specified. In one embodiment, the expected response is communicated to input/output device 108 in the transaction (e.g., in the associated control command). In another embodiment, expected responses as a function of the type of transaction are specified beforehand and stored in input/output device 108, for example, in a lookup table. It is appreciated that other embodiments may utilize other techniques for specifying and recognizing an expected response to a transaction.

If the expected response is recognized by input/output device 108, then timer 120 is canceled (step 415) and, consequently, a timeout condition is not initiated. If an expected response is not recognized, then process 400 proceeds to step 420.

In step 420, if a timer cancellation condition is satisfied, then timer 120 is canceled (step 415) and a timeout condition is not initiated. In the present embodiment, the timer cancellation condition is an allotted time period for responding to a transaction. If the response is provided within the allotted time period, timer 120 is canceled. If the cancellation condition is not satisfied (e.g., if the allotted time period expires), then a timeout condition is identified by input/output device 108 (step 425).

Continuing with step 425, in the present embodiment, input/output device generates a signal to indicate to application 210 that a timeout condition exists. In one embodiment, the signal can be a timeout command code indicating the timeout condition and initiating steps that are to be taken in response. For example, the command code may cause application 210 to re-execute the original transaction, or it may initiate another software element (e.g., another application) to rectify the timeout condition. In another embodiment, the signal can be a bit flag to alert application 210 or the operating system of the timeout condition. Application 210 or the operating system may then initiate remedial actions in response.

With O/S bypass, application 210 can be notified directly of the timeout condition by input/output device 108 via the queue between the device and the application. Without O/S bypass, the operating system is notified of the timeout condition; in turn, the operating system identifies the affected application and notifies the application of the timeout condition.

Thus, in accordance with the present invention, input/output device 108 is used to manage the timer and timer functions. Specifically, input/output device 108 integrated with timer 120 is used to recognize whether the timer should be activated, whether an expected response is received, and whether the allotted time period for the response is exceeded. Input/output device 108 is also used to cancel a timer, or identify a timeout condition and initiate certain actions in response. Thus, computer system 190 (specifically, processor 101) of FIG. 1 is required only to perform actions in response to a timeout condition. In other words, in accordance with the present invention, instead of managing timer functions for every timed transaction, the timer functions for computer system 190 are limited to responding only to those fraction of all transactions that result in a timeout condition (typically, this is a small percentage of the total transactions). Consequently, the processing overhead associated with managing timer and timeout functions can be reduced for computer system 190 by shifting this overhead to the input/output devices.

The input/output devices (e.g., input/output device 108), by virtue of the queues in place between each device and each application, are capable of efficiently communicating a timeout condition to the affected application, in particular in the case of O/S bypass. For example, a transaction is received by input/output device 108 over a queue from application 210 and timer 120 is activated. If a timeout condition exists, only the affected application (e.g., application 210) is notified via the queue between that application and input/output device 108. Thus, processing overhead does not have to be expended to determine which application is affected. Therefore, in accordance with the present invention, the shift of processing overhead from computer system 190 to input/output device 108 not only can reduce the processing overhead of the computer system, but the overall processing overhead associated with the timer and timeout functions can be reduced by shifting these functions to the input/output devices.

In summary, the present invention provides a novel solution for using timers in such a way that they can be implemented with minimal overhead to the operating system. In accordance with the present invention, the robustness of a computer system is enhanced by implementing timers while the impact associated with operating these timers is substantially minimized.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to

What is claimed is:

1. A system for monitoring elapsed time for a transaction, said system comprising:

a computer system having a processor for executing an application to initiate the transaction;

an input/output device communicatively coupled to said computer system, said input/output device receiving from said computer system a control command associated with said transaction;

said input/output device having a timer for measuring time, wherein said timer is activated when said control command is received by said input/output device;

wherein said input/output device cancels said timer when a cancellation condition is satisfied; and said application communicating with said input/output device, bypassing an operating system of said computer system.

2. The system of claim 1 wherein said cancellation condition is a time period allotted for a response to said transaction, wherein said input/output device cancels said timer when a response to said transaction occurs within said time period allotted and identifies a timeout condition when said time period allotted is exceeded.

3. The system of claim 2 wherein said time period allotted is specified in said control command.

4. The system of claim 1 wherein an expected response to said transaction is specified, wherein said input/output device uses said expected response to recognize an actual response to said transaction.

5. The system of claim 1 wherein said input/output device generates a signal to indicate said timeout condition.

6. The system of claim 5 wherein said signal is a command code.

7. The system of claim 5 wherein said signal is a bit flag.

8. The system of claim 5 wherein said signal is sent from said input/output device to an operating system of said computer system.

9. The system of claim 1 wherein said input/output device is a communication device for coupling said computer system to a device that executes said transaction responsive to said application.

10. The system of claim 1 wherein said input/output device executes said transaction responsive to said application.

11. The system of claim 1 wherein said input/output device comprises a plurality of timers monitoring a plurality of concurrent transactions.

12. A system for monitoring elapsed time for a transaction, said system comprising:

a computer system having a processor for executing an application to initiate the transaction;

an input/output device communicatively coupled to said computer system, said input/output device receiving from said computer system a control command associated with said transaction;

said input/output device having a timer for measuring time, wherein said timer is activated when said control command is received by said input/output device;

wherein said input/output device cancels said timer when a cancellation condition is satisfied and otherwise identifies a timeout condition;

said input/output device generates a signal to indicate said timeout condition; and said signal is sent from said input/output device to said application and bypasses an operating system of said computer system.

13. In an input/output device communicatively coupled to a computer system, a method for monitoring elapsed time for a transaction said method comprising the steps of:

a) initiating a transaction by executing an application using said computer system;

b) sending said transaction from said application to said input/output device and bypassing an operating system of said computer system, wherein a control command is associated with said transaction;

c) activating in said input/output device a timer when said control command is received by said input/output device; and d) canceling said timer provided a cancellation condition is satisfied and otherwise identifying a timeout condition.

14. The method for monitoring elapsed time for a transaction as recited in claim 13 wherein said input/output device is a communication device for coupling said computer system to a device that executes said transaction responsive to said application.

15. The method for monitoring elapsed time for a transaction as recited in claim 13 wherein said input/output device is a device that executes said transaction responsive to said application.

16. The method for monitoring elapsed time for a transaction as recited in claim 13 further comprising:

specifying an expected response to said transaction, wherein said input/output device uses said expected response to recognize an actual response to said transaction.

17. The method for monitoring elapsed time for a transaction as recited in claim 13 wherein said cancellation condition is a time period allotted for a response to said transaction, wherein said input/output device cancels said timer provided said response to said transaction occurs within said time period allotted and identifies a timeout condition when said time period allotted is exceeded.

18. The method for monitoring elapsed time for a transaction as recited in claim 17 wherein said time period allotted is specified in said control command.

19. The method for monitoring elapsed time for a transaction as recited in claim 13 further comprising the step of:

e) generating a signal from said input/output device to indicate said timeout condition.

20. The method for monitoring elapsed time for a transaction as recited in claim 19 wherein said signal is a command code.

21. The method for monitoring elapsed time for a transaction as recited in claim 19 wherein said signal is a bit flag.

22. The method for monitoring elapsed time for a transaction as recited in claim 19 wherein said signal is sent from said input/output device to said computer system and causes said computer system to notify said application of said timeout condition.

23. The method for monitoring elapsed time for a transaction as recited in claim 19 wherein said signal is sent from said input/output device to said application and notifies said application of said timeout condition.

24. An input/output device for monitoring elapsed time for a transaction, said input/output device comprising:

a bus for communicatively coupling said input/output device to a computer system; and a timer for measuring time, wherein said timer is activated when a control command associated with said transaction is received from said computer system;

wherein said input/output device cancels said timer provided a cancellation condition is satisfied;

said input/output device generating a signal to indicate said timeout condition; and said input/output device communicates with an application associated with said transaction, bypassing an operating system of said computer system.

25. The input/output device of claim 24 wherein said cancellation condition is a time period allotted for a response to said transaction, wherein said input/output device cancels said timer provided said response to said transaction occurs within said time period allotted and identifies a timeout condition when said time period allotted is exceeded.

26. The input/output device of claim 25 wherein said time period allotted is specified in said control command.

27. The input/output device of claim 24 wherein an expected response to said transaction is specified, wherein said input/output device uses said expected response to recognize an actual response to said transaction.

28. The input/output device of claim 24 wherein said signal is a command code.

29. The input/output device of claim 24 wherein said signal is a bit flag.

30. The input/output device of claim 24 wherein said input/output device is a communication device for coupling said computer system to a device that executes said transaction responsive to said application.

31. The input/output device of claim 24 wherein said input/output device is a device that executes said transaction responsive to said application.

32. A system for monitoring elapsed time of a transaction initiated by an executed application in a processor of a computer system, comprising:

an input/output device having a timer, said input/output device coupled to the processor;

wherein the timer maintains a measure of elapsed time commencing upon the initiation of the transaction;

wherein said input/output device monitors the timer and generates a notification of a timeout condition when an allocated time for a response to the transaction is exceeded such that overhead processing in the processor is reduced since the processor is only notified when the timeout condition is detected; and wherein the application is notified directly of the timeout condition by said input/output device through a queue in place between said input/output device and the application.

33. The system of claim 32 wherein the timer is implemented in software executed by said input/output device.

34. The system of claim 32 wherein the measure of elapsed time is a countdown from the allocated time.

35. The system of claim 32 wherein the timer only measures the elapsed time for the transaction if the transaction is a timed event.

36. The system of claim 32 wherein the timer is activated when a control command associated with the transaction is received by said input/output device.

37. The system of claim 36 wherein the allocated time is specified in the control command.

38. The system of claim 32 wherein the timeout condition is indicated by a command code sent from said input/output device to the application.

39. The system of claim 38 wherein the command code is sent over a queue coupled between said input/output device and the application.

40. The system of claim 32 wherein the generated notification contains a bit flag that is set to indicate the timeout condition.

41. The system of claim 32 wherein said input/output device is one of a modem, a network interface card (NIC), and a network adapter.

42. The system of claim 32 wherein said input/output device is a hardware device from the group comprising one of a graphics adapter, a video adapter, an audio device, and a video device.

43. A system for concurrently monitoring elapsed time of a plurality of transactions initiated by corresponding executed applications in a processor of a computer system, comprising:

an input/output device having a plurality of timers, said input/output device coupled to the processor;

wherein each of the plurality of timers maintain a measure of elapsed time commencing upon initiation of a corresponding one of the plurality of transactions;

wherein said input/output device monitors the plurality of timers and generates a notification of a timeout condition when an allocated time for a response to any one of the plurality of transactions is exceeded, and notifies the processor only when the timeout condition is detected such that overhead processing in the processor is reduced; and wherein the corresponding executed application is notified directly of the timeout condition by said input/output device through a queue in place between said input/output device and the corresponding executed application.

44. The system of claim 43 wherein the plurality of timers are implemented in software executed by said input/output device.

45. The system of claim 43 wherein each measure of elapsed time is a countdown from the allocated time for the corresponding one of the plurality of transactions.

46. The system of claim 43 wherein each of the plurality of timers is activated when a control command associated with a corresponding one of the plurality of transactions is received by said input/output device.

47. The system of claim 43 wherein said input/output device is one of a modem, a network interface card (NIC), and a network adapter.

48. The system of claim 43 wherein said input/output device is a hardware device from the group comprising one of a graphics adapter, a video adapter, an audio device, and a video device.

49. A method for monitoring elapsed time of a transaction initiated by an executed application in a processor of a computer system, comprising:

monitoring an elapsed time beginning when the transaction is initiated;

generating a notification of a timeout condition when an allocated time for a response to the transaction is exceeded;

sending a signal to the processor in response to the timeout condition to notify the processor when the timeout condition is present;

whereby the processor can in turn notify only the executed application affected by the timeout condition, thereby reducing overhead processing in the processor; and wherein the executed application is notified directly of the timeout condition by an input/output device through a queue in place between the input/output device and the executed application.

50. The method of claim 49, further comprising:

detecting whether the transaction is a timed event; and monitoring the elapsed time only when the transaction is a timed event.

51. The method of claim 49 wherein said monitoring step is implemented in software.

52. The method of claim 49 wherein said monitoring step is a countdown from the allocated time.

53. The method of claim 49 wherein said monitoring step only monitors the elapsed time for the transaction if the transaction is a timed event.

54. The method of claim 49 wherein the generated notification contains a bit flag that is set to indicate the timeout condition.

55. An input/output device for providing a notification of a timeout condition in an application of a computer system, comprising:

timer means for measuring an elapsed time of a transaction initiated by the application;

notification means for monitoring said timer means and generating a notification of the timeout condition when an allocated time for a response to the transaction is exceeded;

signaling means for sending a signal to a processor of the computer system in response to the timeout condition, wherein said timer means measures and said notification means monitors so as to eliminate the need for the processor to determine the application affected with the timeout condition; and wherein the application is notified directly of the timeout condition by the input/output device through a queue in place between the input/output device and the application.

* * * * *